Patented Nov. 25, 1952

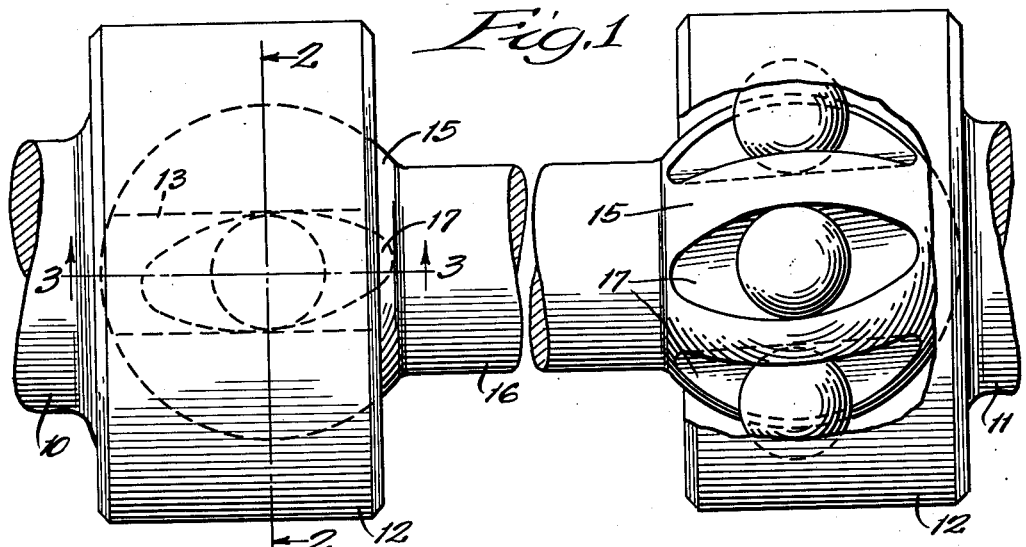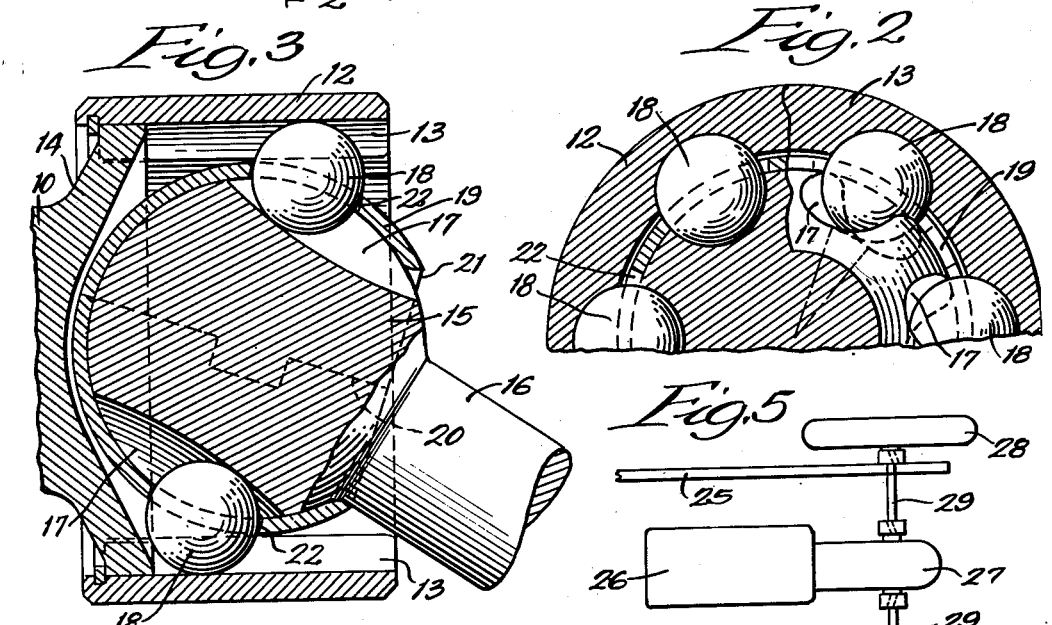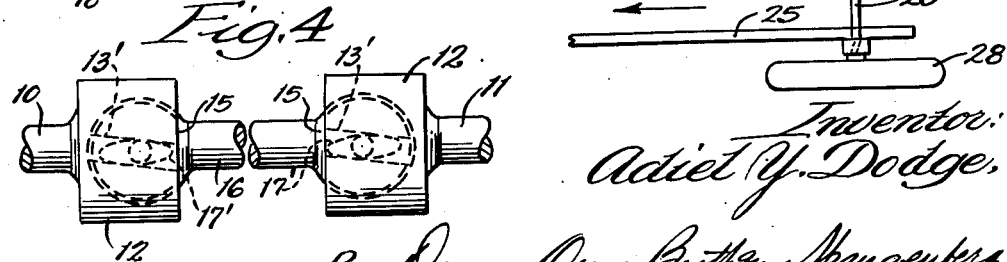

2,618,942

UNITED STATES PATENT OFFICE 2,618,942

UNIVERSAL JOINT

Adiel Y. Dodge, Rockford, Ill.

Application March 11, 1948, Serial No. 14,198

7 Claims. (Cl. 64—8)

This invention relates to universal joints and more particularly to a constant velocity universal drive assembly for connecting a pair of members which may be angularly or laterally displaced.

It is one of the objects of the invention to provide a universal drive assembly in which the thrusts produced at the driving and driven ends of the assembly are balanced against each other.

Another object is to provide a universal joint which also functions as a slip joint. According to one feature of the invention the joints are arranged in pairs in a drive assembly in such a way that the thrusts are balanced out and in this way the joints may function as slip joints.

A specific object is to provide a joint in which the grooves in one of the joint members, preferably the outer member, are made straight and parallel to the axis of the member to provide for relative axial movement. This construction eliminates end thrust on the outer member and simplifies manufacture since it enables the grooves in the outer member to be formed by broaching or similar relatively simple processes.

A further object is to provide a universal joint in which the thrusts developed during operation are absorbed by a cage which also serves to guide the balls. Preferably, the cage fits around the inner spherical joint member and is arranged to absorb the major driving thrust at its closed end.

According to one feature of the invention the joints are so arranged that the thrust caused by the action of the balls or by the combined action of the balls and slipping will be imposed upon the closed end of the ball cage at all times during normal drive, thereby relieving the open end of the cage from the imposition of thrust loads.

A further object is to provide a universal joint in which the ball grooves in the inner race member are at an angle with the axis of the inner race member but may be straight. They can be milled, broached or hobbed as desired.

In this type of joint the angle of the ball grooves plus the cage control the balls, causing them to always lie in a plane which bisects the angle of the shafts.

The above and other objects and advantages of the invention will be more readily apparent from the following description when read in connection with the accompanying drawing, in which—

Figure 1 is a side elevation of a universal drive assembly embodying the invention with parts broken away;

Figure 2 is a section on the line 2—2 of Figure 1;

Figure 3 is an axial section through one of the universal joints on the line 3—3 of Figure 1;

Figure 4 is a reduced view similar to Figure 1 of an alternative construction; and Figure 5 is a diagrammatic plan view of a vehicle drive arrangement employing universal drive assemblies according to the invention.

The universal drive assembly, as illustrated in Figure 1, is adapted to connect a pair of shafts 10 and 11 which may be subject to angular or lateral misalignment. Each of the shafts carries an annular coupling or joint member 12 which, as best seen in Figures 2 and 3, comprises an annular ring member formed with a series of ball receiving grooves 13 therein. The ring member may be recessed at one end to receive a flange 14 carried by the adjacent shaft and formed to interfit with the grooves in the ring member. A snap ring as shown may hold the flange in place in the ring member so that the parts are assembled, as more particularly described and claimed in my Patent No. 2,309,939.

Each joint member 12 forms a part of a universal joint assembly which is completed by a generally spherical end member 15 on a shaft 16. The end members 15 may be formed integrally with the shaft, as shown, or may, if preferred, be formed separately and be rigidly attached to the ends of the shaft. Each spherical member lies within a corresponding ring member 12 and is formed in its periphery with grooves 17 equal in number to the grooves 13 to register therewith. Each pair of grooves 13 and 17 receives a driving ball 18 drivably to connect the two parts of the joint.

The balls are held in place and are properly positioned during operation of the joint by a cage 19 formed, as best seen in Figure 3, of relatively thin metal and of partially spherical shape to fit over the spherical end members 15. Each cage is formed at one end with an enlarged opening 21 through which the shaft 16 may project and is provided around its periphery with a series of annularly aligned openings 22 through which the balls extend. The cage has a sliding fit on the spherical end portions 15 and preferably fits relatively snugly thereon so that it can absorb the thrust of the balls, as described hereinafter. The cages may be formed in any desired manner but as shown are made of two parts fitted together along stepped parting lines indicated at 20.

According to the present invention, one of the series of grooves 13 and 17 of each joint extends generally parallel to the axis of the member in which the grooves are formed and the other series of grooves has a slight helix angle. As shown in Figures 1 to 3, the grooves 13 in the outer ring members 12 extend axially while the grooves 17 are given a slight helix angle, as best seen in Figure 1. Both sets of grooves 17 have a helix angle of like hand when viewed from the same directions so that the thrusts produced thereby during operation will be in opposite directions. This is because the outer joint member at one end is the driving member and is the driven member at the other end so that the reaction torque comes from different elements in the different joints. In the embodiment of Figure 4, the grooves 17' in the spherical end members 15 extend axially and the grooves 13' in the ring members 12 have a slight helix angle, as shown. Otherwise, the construction of Figure 4 is identical with the construction of Figures 1 to 3.

One feature of the present invention relates to the formation of the grooves 17 as straight grooves with straight bottoms lying at an angle of from ten to fifteen degrees to the axis of the shaft 16. In this type of groove the ends of the groove lie farther from the axis than the center portion. This enables the grooves to be formed cheaply by a simple milling or hobbing operation with a high degree of accuracy. More importantly this construction provides a coarser angle of action on the balls than a true helical groove to improve the action of the balls.

With prior constructions when the axes of the joint members first start to move out of alignment, the balls tend to be pinched and are apt to jump to their new position, thereby causing noise and possibly irregular operation. With the grooves 17 straight, as shown, they present a coarser effective angle to the balls to move them more easily. Movement of the balls is also facilitated by making one set of grooves straight so that they offer no resistance to ball movement in or out and placing the entire angle in the other set of grooves.

In operation of the construction shown in Figures 1 to 3, assuming that the shaft 10 is the driving shaft and is turning in a counter-clockwise direction, when viewed from the left of Figure 1, the balls in the left universal joint will tend to move to the right while those in the right hand universal joint will tend to move to the left. The balls are held against actual movement by the cages 19 so that the balls are properly positioned and are held in a plane at all times. It will be noted that the thrust of the balls on the cages tends to draw the closed end of the cages over the spherical members 15 so that the thrust is taken by the closed ends of the cages which provide maximum strength. This is the normal direction of drive, as, for example, the forward direction in a vehicle. Upon a reversal of the drive, the cages tend to move in the opposite directions and are resisted by engagement of the open ends thereof with the adjacent portions of the spherical members.

Upon angular displacement of the shaft 16 relative to either of the shafts 10 or 11, the joint will assume the position shown in Figure 3. At this time, certain of the balls are located by crossing of the grooves in which they are positioned to control the position of the cages and thereby the positions of the remaining balls. This operation is similar to that more fully described in my Patent No. 2,309,939. Thus, the cage serves to guide the balls as well as to resist the thrust thereof. It will further be noted that in this construction the universal joints may also serve as slip joints since the balls may at all times move freely longitudinally of the grooves 13.

In operation of the construction shown in Figure 4, the angularity of the grooves 13' produces thrusts on the balls which are in opposite directions. If it is again assumed that the shaft 10 is the driving shaft and is turning counter-clockwise, as viewed from the left in Figure 4, the thrusts at both ends of the shaft 16 will be inward tending to compress the shaft. The balls are held against axial movement by the cages, and the thrust thereof tends to move the cases inward over the spherical members 15 so that the thrust in the normal drive direction is absorbed by the closed ends of the cages which provide maximum strength and bearing area and at a more favorable angle to absorb thrust as against absorbing the thrust by the open side of one of the cages. Upon a reversal of the drive, the thrusts on both sets of balls are outward to tension the shaft 16. Thus, under all conditions, the end thrusts on the shaft 16 are balanced so that the shaft may have an endwise movement in either direction with little effort. Due to this balancing of the thrusts, the joints may also serve as slip joints even though the grooves 13' are angular.

A drive assembly for an automotive vehicle according to the present invention is diagrammatically shown in Figure 5. In this figure the vehicle frame is indicated at 25 and carries an engine 26 which drives a transmission and differential gear 27. The differential gear drives road wheels 28 through separate universal drive assemblies each of which includes a shaft 29 connected through universal joints as described above to the differential and the wheels respectively.

In this type of use the universal drive assembly at the right side of the vehicle when viewed in the direction of normal forward travel is formed with grooves in the spherical inner members having a left hand helix like angle and the assembly at the left side of the vehicle is formed with grooves in the inner members having a right hand helix like angle. Preferably the outer race members have straight ball grooves extending parallel to the axis. However, the parallel grooves may be put in the inner member and the angular grooves in the outer member, when desired. Thus in normal forward drive the thrust loads are inward toward the shaft centers at both sides of the vehicle and are absorbed by the closed ends of the cages. Also any transmission of thrust to the differential or wheel assemblies is either eliminated or balanced out and the assemblies are enabled to function more freely as slip joints.

While several embodiments of the invention have been shown and described in detail, it will be understood that they are illustrative only and are not intended to be a definition of the scope of the invention, reference being had for this purpose to the appended claims.

What is claimed is:

1. A universal joint comprising a shaft having a generally spherical head at its end, an annular ring fitting around the head, the head and the ring being formed with registering sets of ball receiving grooves with the grooves in one extending at an acute angle to its axis and the grooves in the other extending parallel to its axis, and balls fitting in the registering grooves of the sets.

2. A universal joint comprising a shaft having a generally spherical head at its end, an annular ring fitting around the head, the head and the ring being formed with registering sets of ball receiving grooves with the grooves in one extending at an acute angle to its axis and the grooves in the other extending parallel to its axis, balls fitting in the ristering grooves of the sets, and a cage fitting over the head and formed with annularly aligned openings through which the balls extend to hold the balls in a plane.

3. A universal joint comprising a shaft having a generally spherical head at its end, an annular ring fitting around the head, the ring being formed with a series of grooves therein parallel to its axis and the head being formed with a registering series of grooves at an angle to its axis, and balls in the registering grooves of the series.

4. A universal joint comprising a shaft having a generally spherical head at its end, an annular ring fitting around the head, the ring being formed with a series of grooves therein parallel to its axis and the head being formed with a registering series of grooves at an angle to its axis, balls in the registering grooves of the series, and a cage fitting slidably over the head and formed with annularly aligned openings through which the balls extend.

5. A universal joint comprising a shaft having a generally spherical head at its end, an annular ring fitting around the head, the ring being formed with a series of grooves therein parallel to its axis and the head being formed with a registering series of grooves at an angle to its axis, balls in the registering grooves of the series, and a hollow partially spherical cage fitting slidably over the head, the cage having an opening at one side through which the shaft extends and having a series of openings in its side wall in a plane parallel to the plane of the first named opening through which the balls extend.

6. A universal joint comprising a shaft having a generally spherical head at its end, an annular ring fitting around the head, the ring being formed with a series of internal grooves extending at an angle to its axis, the head being formed with a series of grooves lying at an acute angle to the shaft axis and being straight throughout their length so that the end portions lie at a greater distance from the shaft axis than the central portions, and balls in the registering grooves of the series.

7. A universal joint comprising a shaft having a generally spherical head at its end, an annular ring fitting around the head, the ring being formed with a series of internal grooves extending at an angle to its axis, the head being formed with a series of grooves lying at an acute angle to the shaft axis and being straight throughout their length so that the end portions lie at a greater distance from the shaft axis than the central portions, balls in the registering grooves of the series, and a cage fitting over the head and formed with annularly aligned openings through which the balls extend to hold the balls in a plane.

ADIEL Y. DODGE.

REFERENCES CITED

The following references are of record in the file of this patent:

UNITED STATES PATENTS

| Number | Name | Date |
| --- | --- | --- |
| 2,044,196 | Alden et al. | June 16, 1936 |
| 2,309,939 | Dodge | Feb. 2, 1943 |
| 2,380,113 | Kuhns | July 10, 1945 |